(No Model.)
M. HAUGHEY.
CARRIAGE SPRING.
No. 321,496. Patented July 7, 1885.
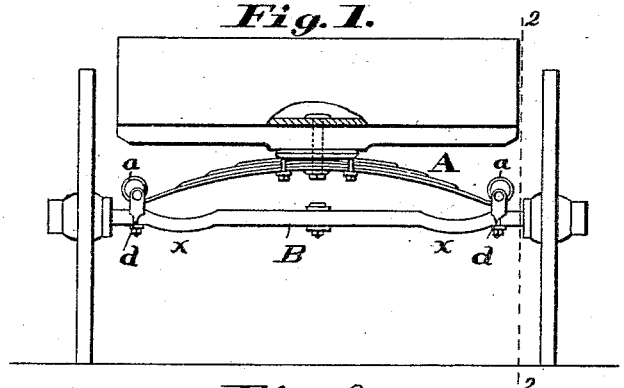
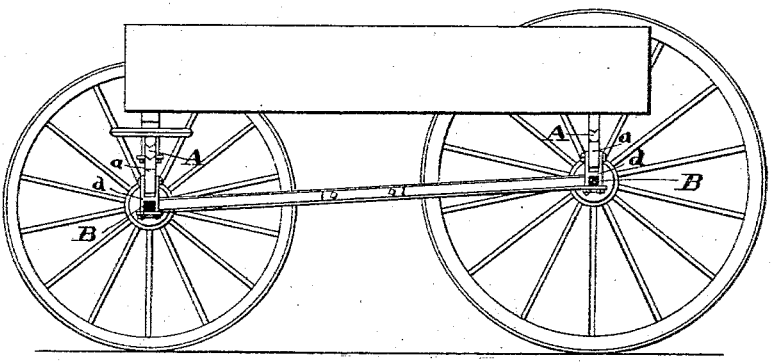
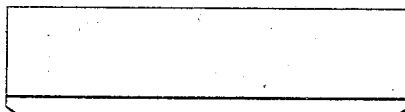
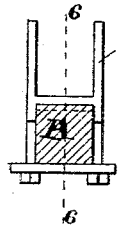 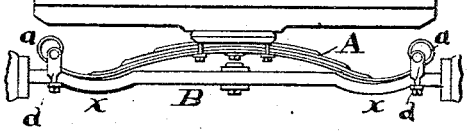 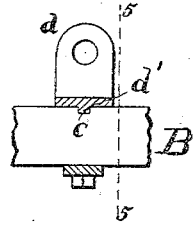
Attest:
Inventor:
Michael Haughey
by Paul Bakewell
his attorney.

UNITED STATES PATENT OFFICE.

MICHAEL HAUGHEY, OF ST. LOUIS, MISSOURI.

CARRIAGE-SPRING.

SPECIFICATION forming part of Letters Patent No. 321,496, dated July 7, 1885.

Application filed October 2, 1884. (No model.)

*To all whom it may concern:*

Be it known that I, MICHAEL HAUGHEY, a citizen of the United States, residing at the city of St. Louis, State of Missouri, have invented a certain new and useful Improvement in Carriage-Springs, of which the following is a full, clear, and exact description, reference being had to the accompanying drawings, in which—

Figure 1 is a top plan of running-gear of a carriage, showing fifth-wheel on top of center of my improved spring; Fig. 2, a vertical section on line 2 2 of Fig. 1; Fig. 3, elevation of front end, showing spring compressed; Fig. 4, elevation of the front end when spring is not compressed; Fig. 5, detail section of axle and clip on line 5 5 of Fig. 6; Fig. 6, detail section of axle and clip on line 6 6 of Fig. 5.

My invention relates especially to the construction of a carriage-spring with a view to its simplicity, elasticity, and strength, and with relation to the points of bearing of the spring upon the axle, and to the construction of the clips and axles of the carriage in conformity with these ends.

The objects of my invention are to do away with wood-work in running-gear of a carriage, to distribute and bear weight of carriage and contents upon parts of axle best calculated to stand pressure without bending, to provide a spring with the least possible number of working parts consistent with efficiency, durability, and strength, and to provide a spring simple and cheap in construction. These objects I accomplish by making my spring in form the half-elliptic, the lowest plate being curved at the ends $a$ $a$, as shown in Figs. 1, 3, and 4, so as to form a circle, and attaching this spring at both ends to axle at points on axle very near the hub of wheels by means of clips $d$ $d$.

The clip $d$ (particularly shown in Figs. 5 and 6 of drawings) is made to conform to shape of axle, and is provided with a lug, $d'$, (shown in Fig. 6,) which lug is made to fit into a corresponding recess, $c$, in axle, (also shown in Fig. 6). Then in any suitable manner, preferably as shown in drawings—that is, by means of a bottom plate through which threaded ends or arms of clip pass, and upon which threaded ends a nut is fastened—the clip is made to embrace the axle firmly, the lug $d$ on clip fitting into recess $c$ in axle, thereby preventing clip from slipping out of place.

The fifth-wheel in my construction is attached by means of nuts and bolts to the center of top of my improved spring. Another part of fifth-wheel is attached to front end of bed of carriage by means of nuts and bolts. A king-bolt passes through center of spring and right through several parts of fifth-wheel and bed of carriage, connecting carriage with spring.

The arrangement of my fifth-wheel is particularly shown in Fig. 1 of drawings.

In the construction of my spring the curved ends $a$ $a$ give more elasticity and lateral play to my spring, and cause the pressure to bear more directly down upon the axle than laterally against the clip.

In the drawings, A represents the spring; $a$ $a$, ends of spring curved into a circular form; B, the axle; $x$ $x$, depressions in axle; $d$, clip; $d'$, lug of clip; $c$, slot in axle.

The axle used in connection with my improvement can be a straight axle; but my preferable construction is shown in Figs. 1 and 3, where the axle is shown bent at the parts $x$ $x$, forming depressions, into which the parts of spring which are the thinnest and most susceptible of bending will drop at a heavy jolt or under pressure.

Another construction is that shown in Fig. 4, where the axle is bent from the points at which the clips are attached, forming one continuous uniform depression under the spring, thereby giving the spring more play.

It will be noticed in all these constructions that the axle, spring, and rigid clips are so arranged in relation to each other that the axle shall afford a rest or stop to the downward movement of the middle portion of the spring; that, owing to the coils of the spring being away from the axle, more lateral movement or play is given to the spring, and that, the coils of the spring completely encircling the pintles of the clips, the pressure is caused to bear more directly down upon the axle.

The advantages of my improvement are these: The weight is distributed upon the axle at the points best calculated to sustain it—that is, next the hubs of the wheels. The fifth-wheel is connected directly with spring, instead of being connected directly with axle.

The construction of the spring, together with its curved ends, serves to give the carriage an easy upward and downward motion, with just sufficient play from the sides to prevent stiffness, and not enough to allow of an unsteady rocking motion.

I claim—

As an improvement in carriage-springs, the combination of a half-elliptic spring, A, having the ends $a\,a$ of its bottom plate curved into a circular form and secured directly to pintles of clips away from the axles, clips $d\,d$, rigidly secured to the axle, and the axle B, situate below the spring, so that the spring shall have a lateral play or movement and the axle shall act as a stop to the downward movement of the middle portion of the spring, substantially as and for the purposes specified.

In testimony whereof I have affixed my signature, in presence of two witnesses, this 19th day of September, 1884.

MICHAEL HAUGHEY.

Witnesses:
 PAUL BAKEWELL,
 FERNANDO SAUTER.